INVENTORS.
ALLEN G. BAKER
and BRIAN DALE

BY David M. Keay

AGENT.

INVENTORS.
ALLEN G. BAKER
and BRIAN DALE

BY David M. Kaye

AGENT.

July 22, 1969 A. G. BAKER ET AL 3,456,334

METHOD OF PRODUCING AN ARRAY OF SEMICONDUCTOR ELEMENTS

Filed May 3, 1967 4 Sheets-Sheet 3

INVENTORS.
ALLEN G. BAKER
and BRIAN DALE

BY David M. Keay

AGENT.

INVENTORS.
ALLEN G. BAKER
and BRIAN DALE

BY David M. Keay

AGENT.

United States Patent Office 3,456,334
Patented July 22, 1969

3,456,334

METHOD OF PRODUCING AN ARRAY OF SEMICONDUCTOR ELEMENTS

Allen G. Baker, Cambridge, and Brian Dale, Lynnfield, Mass., assignors to Sylvania Electric Products Inc., a corporation of Delaware Filed May 3, 1967, Ser. No. 635,904
Int. Cl. B01j *17/00;* H01l *7/00*
U.S. Cl. 29—577 8 Claims

ABSTRACT OF THE DISCLOSURE

Method of forming an array of silicon dice from a wafer having a coating of silicon oxide on its surface. The silicon of the wafer is dissolved so as to form individual dice which are supported in fixed relationship to each other by the silicon oxide. Each die can be separated from the array by breaking of the oxide holding the die in the array.

BACKGROUND OF THE INVENTION

This invention relates to semiconductor electrical translating devices. More particularly, it is concerned with improved methods of producing semiconductor devices including fabricating an array of semiconductor elements from which individual elements readily can be removed for mounting.

Present techniques of diffusing conductivity type imparting materials through small precisely defined openings in protective coatings (typically silicon oxide) on bodies of semiconductor material (typically silicon) have made possible the fabrication of semiconductor devices such as diodes, transistors, and integrated circuit networks of exceptionally small size. By employing these processing techniques the electrically active zones of a large number of devices are fabricated simultaneously in a single wafer of semiconductor material.

After the formation of the electrically active zones, the wafer is divided into individual dice, each containing the electrically active zones of a semiconductor device. Typically from this point on each die is processed as an individual unit. Each die is individually manipulated, oriented, properly positioned on a suitable mounting header, such as a part of an enclosure or circuit board, and then bonded in place with appropriate electrical connections provided between the active zones and conductive members of the header.

A method of handling semiconductor elements and headers in batches while successively mounting the semiconductor elements onto the headers which avoids many of the problems inherent in the more traditional mounting procedures is described and claimed in application Ser. No. 539,444, filed Apr. 1, 1966, by Brian Dale and Robert C. Ingraham entitled, "Method of Producing Semiconductor Devices," now Patent No. 3,387,359, and assigned to the assignee of the present invention. In the method described in the foregoing application, semiconductor elements are supported in a network of supporting members of the so-called beam-lead construction by beams fixed to each individual semiconductor element and to the supporting network. The entire array is manipulated and oriented to position each element in succession in proper position for mounting. The beam holding the semiconductor element in the network is not cut to sever the element from the array until the element is properly aligned with respect to a mounting header and the mounting apparatus.

SUMMARY OF THE INVENTION

In accordance with the present invention an array of semiconductor elements is fabricated from a body of semiconductor material having a plurality of regions, each region having the electrically active zones of a semiconductor element fabricated therein. A surface of the body is coated with an adherent layer of a non-conductive protective material, such as silicon oxide. Semiconductor material of the body is removed to leave discrete dice of semiconductor material, each die including the electrically active zones of a semiconductor element. Removal of the semiconductor material causes the dice to be supported in fixed relationship to each other by non-conductive material of the layer. Thus, an array of semiconductor elements is provided. Prior to removal of the semiconductor material, portions of the layer of non-conductive material may be removed from the body of semiconductor material to expose the surface of portions of the body, to leave non-conductive material overlying portions of the surface of each of the regions, to leave a segment of non-conductive material projecting from the non-conductive material overlying the surface of each of the regions, and to leave a supporting network of non-conductive material adherent to each of said segments of the non-conductive material at a point spaced from its associated region.

Semiconductor elements of the array may be mounted on mounting headers. A mounting header is positioned at a bonding location and oriented in a predetermined manner. The non-conductive material supporting a semiconductor element in fixed relationship to every other semiconductor element is broken either before or subsequent to mounting of the semiconductor element on the header, depending upon the particular transfer and bonding procedures employed.

BRIEF DESCRIPTION OF THE DRAWINGS

Various objects, features, and advantages of the method of the invention will be apparent from the following detailed discussion and the accompanying drawings wherein.

Figure 1:
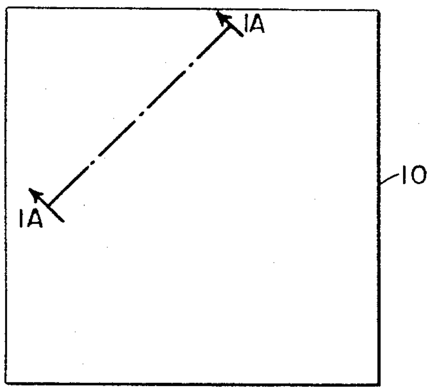
FIG. 1 is a plan view of a fragment of a wafer of silicon within which the electrically active zones of a plurality of semiconductor transistors have been formed by diffusion.

Because of the extremely small size of various portions of the items illustrated in the drawings some of the dimensions, particularly vertical dimensions, of many of the items have been exaggerated with respect to other dimensions. It is believed that greater clarity of presentation is thereby obtained despite consequent distortion of items in relation to their actual physcial appearance.

DETAILED DESCRIPTION OF THE INVENTION

Figure 1A:
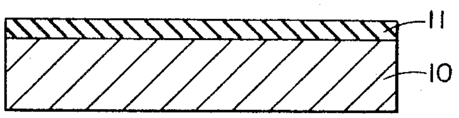
FIG. 1A is an enlarged view of a portion of the fragment of FIG. 1 taken in cross-section along line 1A—1A of FIG. 1.

A fragment of a wafer of silicon 10 having the electrically active zones of a plurality of identical semiconductor elements fabricated therein is illustrated in FIGS. 1 and 1A. The electrically active zones of the semiconductor elements were formed by diffusing conductivity type imparting materials into the wafer through openings in oxide coatings on the upper of the opposed, flat, parallel, major surfaces of the wafer to form zones of opposite conductivity types. For illustrative purposes each group of zones is the electrically active zones of a transistor. Each group of zones occupies a region of the wafer, and the regions are evenly distributed in a regular pattern over the wafer. The major surface of the wafer into which the conductivity type imparting materials have been diffused is coated with an adherent protective layer of silicon oxide 11. Depending upon the procedures employed in producing the diffused zones, the oxide coating may or may not have some openings therein at the stage depicted in FIGS. 1 and 1A. No openings are shown in FIGS. 1 and 1A.

Figure 2:
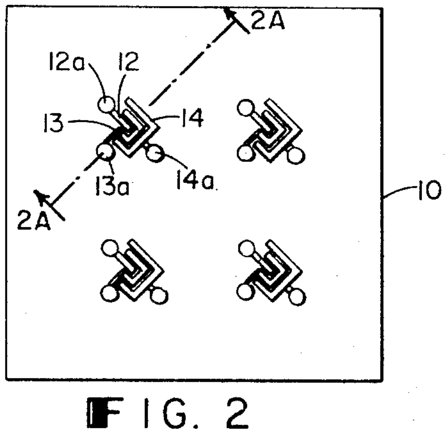
FIG. 2 is a plan view of the fragment of FIG. 1 after the formation of contact members connected to the electrically active zones of each transistor.
Figure 2A:
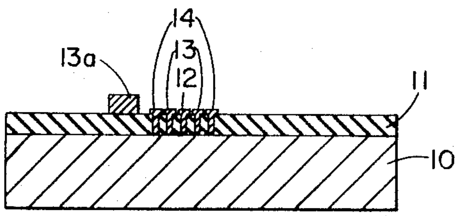
FIG. 2A is an enlarged view of a portion of the fragment taken in cross-section along line 2A—2A of FIG. 2.

The wafer 10 is treated in accordance with well known photo-resist masking and chemical etching techniques to remove portions of the adherent silicon oxide layer in order to expose the surface areas of the electrically active zones to which electrical contact is to be made. As illustrated in FIGS. 2 and 2A contact members 12, 13, and 14 are then formed for each region. Portions of the contact members 12, 13, and 14 make electrical connection to the emitter, base, and collector zones, respectively, at the openings in the oxide coatings. Other portions **12*a*, 13*a*, and 14*a* of the contact members overlie the silicon oxide layer covering the region and are of greater thickness so as to provide mounting contact pads. The contact members may be formed by the well known processes of depositing an aluminum film, appropriately masking the film, and chemically etching to leave contact members of the desired configuration. The mounting pads 12*a*, 13*a*, and 14*a*** may be formed by depositing aluminum through an aperture mask.

Although one type of contact members has been described, other types, for example beam-lead supporting members or thin films of aluminum, may be employed. The particular type of contact members employed depends upon the manner in which the semiconductor elements will be mounted and connected to mounting headers.

Figure 3:
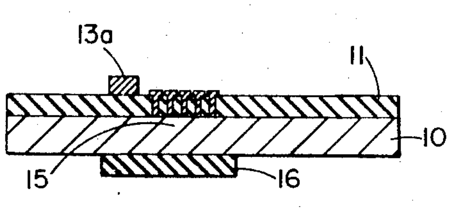
FIG. 3 is an enlarged view in cross-section of a portion of the fragment of the wafer illustrating the wafer prepared for the step of removing silicon.

Next, the wafer is treated to remove the silicon of the body except the regions 15 containing the electrically active zones of the semiconductor elements. The wafer is mounted with its upper surface against a suitable block or plate. Then the thickness of the entire wafer is reduced by lapping the exposed under surface of the wafer or by immersing the assembly in a suitable etching solution which dissolves silicon. For example, a mixture of 1 part by volume of 48 percent by weight hydrogen fluoride solution and 20 parts by volume of C.P. grade nitric acid may be used as an etching solution. After the wafer has been reduced to the desired thickness, the under surface of the wafer is masked with a suitable protective material 16 as shown in FIG. 3 to protect only the regions 15 containing the electrically active zones. The assembly is immersed in the etching solution until all the unprotected silicon is dissolved.

Figure 4:
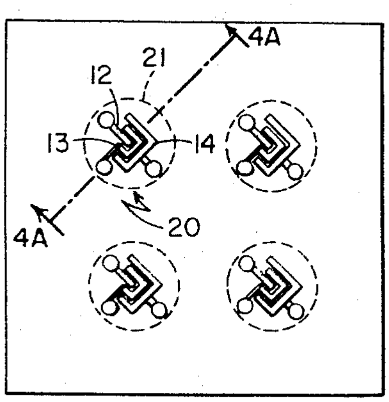
FIG. 4 is a plan view of the fragment after the removal of a major portion of the silicon of the body to leave individual dice supported by the layer of silicon oxide.
Figure 4A:
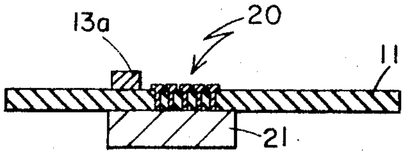
FIG. 4A is an enlarged view of a portion of the fragment taken in cross-section along line 4A—4A of FIG. 4.

The resulting array of semiconductor elements is illustrated in FIGS. 4 and 4A. Each semiconductor element 20 of the array includes a discrete die 21 of silicon containing a group of diffused active zones constituting a transistor. Contact members 12, 13, and 14 make contact to the active zones thereby providing electrical connections to the emitter, base and collector zones, respectively, of the element. The silicon oxide layer remains, providing a supporting structure which holds each of the semiconductor dice in fixed relationship to every other die.

Figure 5:
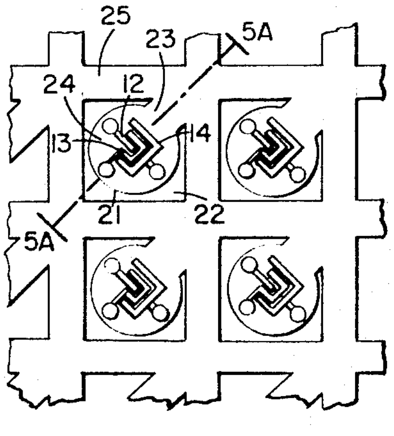
FIG. 5 is a plan view of a fragment of a wafer which has been processed in accordance with a modification of the method of the invention by removing portions of the silicon oxide layer prior to removal of the major portion of the silicon body.
Figure 5A:
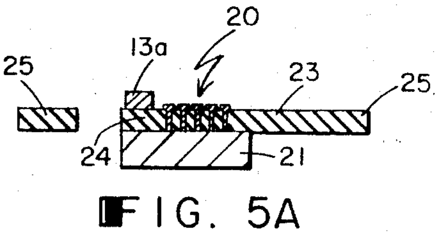
FIG. 5A is an enlarged view of a portion of the fragment of FIG. 5 taken in cross-section along line 5A—5A of FIG. 5.

FIGS. 5 and 5A illustrate a modification of the array of semiconductor elements of FIGS. 4 and 4A. In producing the array of FIGS. 5 and 5A the semiconductor wafer is treated prior to removal of the silicon of the body so as to remove portions of the silicon oxide coating 11 from the upper major surface. The wafer is treated in accordance with well-known photo-resist masking and chemical etching techniques to remove the adherence silicon oxide from certain predetermined portions 22 of the wafer of silicon. This procedure may best be performed together with removal of the oxide to form openings for the contact members 12, 13, and 14. A mixture of 400 milliliters of 40 percent by weight ammonium fluoride aqueous solution and 35 milliliters of 48 percent by weight hydrogen fluoride solution may be used to dissolve the silicon oxide. After the desired portions of the oxide layer have been dissolved, the contact members 12, 13, and 14 are formed and the treatment for removing the silicon of the body is carried out as explained previously.

As illustrated in FIGS. 5 and 5A the oxide is removed from portions 22 of the wafer lying adjacent the region 15 containing the electrically active zones. The silicon oxide of the layer remaining on the surface of the wafer includes a segment 23 of silicon oxide in the shape of a single bar projecting from the silicon oxide 24 overlying each region containing the active zones of a semiconductor element. The segments extend to a network of silicon oxide strips 25. As shown, the network is in the form of a grid of two sets of parallel strips intersecting at right angles. A region containing the electrically active zones of a semiconductor element is located centrally of each opening formed by the intersection sets of oxide strips. Although only a single bar of silicon oxide is shown projecting from the oxide over each region, two or more may be employed if it is found desirable.

As a specific example, an array of semiconductor elements as shown in FIGS. 4 and 4A may include silicon dice 21 which are approximately 6 mils in diameter and 1½ mils thick and spaced at 20 mil intervals in both directions. The contact pad portions **12*a*, 13*a*, and 14*a* of the contact members are about 4 microns thick. The sheet of silicon oxide 11** is approximately 10,000 angstrom units thick.

Figure 6:
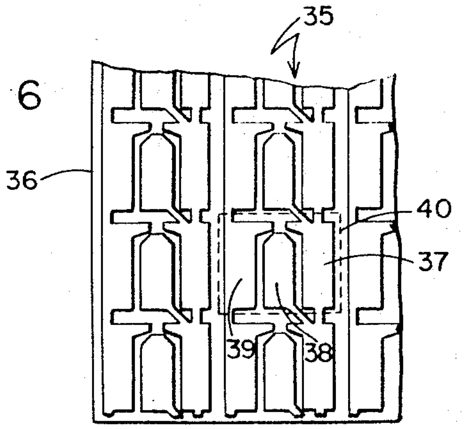
FIG. 6 is a plan view of a fragment of an array of mounting headers showing several groups of conductive regions to which semiconductor elements of an array are to be attached.

One example of a manner in which the semiconductor elements of an array may be mounted on headers is illustrated by FIGS. 6 through 9. The individual semiconductor elements of an array of elements may be mounted successively on the mounting headers of an array of headers 35 as shown in FIG. 6. The array includes a flat plate or board 36 of non-conductive material having a plurality of groups of conductive regions 37, 38, and 39 on one surface. The array may be produced as in the manner of fabricating circuit boards in which a clad metal layer, as of copper, on an insulating board is selectively removed to leave a desired pattern of conductive regions. The board is then suitably plated to provide a surface layer of gold on the conductive regions.

Each group of regions together with a portion of the insulating board to which it adheres provides a mounting header, one of which is delineated by the dashed line 40 in FIG. 6. The configuration and spacing of the conductive regions of each group is such that they will accommodate the mounting pads of the contact members of a semiconductor element and provide conductive paths for the active zones of the element as will be explained hereinafter. As shown, the substantially identical groups of conductive regions are located on the insulating board to provide a regular two-dimensional array of mounting headers arranged in a square pattern of even rows and columns.

Although each header of the array as shown is suitable for mounting a single semiconductor element, each mounting header may include an arrangement of conductive regions to accommodate two or more semiconductor elements and also other components. That is, the array of mounting headers could be an array of circuit boards.

Figure 7:
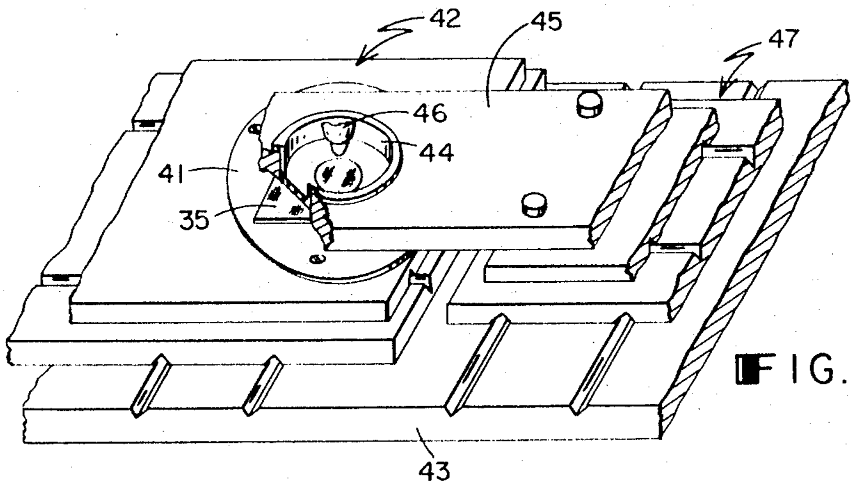
FIG. 7 is a representation in perspective of movable supports and a tool column for successively aligning semiconductor elements of an array above mounting headers of an array and for bonding the aligned semiconductor element to conductive regions of the mounting header.

A representation of portions of apparatus for removing semiconductor elements from the array of semiconductor elements and bonding them to the mounting headers of the array of headers is illustrated in FIG. 7. The array of mounting headers 35 is mounted on a rotatable plate 41 which in turn is mounted on a lateral slider assembly 42. Thus, the array of headers may be rotated, to a limited extent, and moved laterally in any direction to orient the mounting headers and register them in a desired position with respect to a base member 43.

The array of semiconductor elements, a fragment of which is shown in FIGS. 4 and 4A, is attached to the periphery of a central opening in a ring 44 with the semiconductor dice 21 upward. The supporting ring 44 holding the array of semiconductor elements is rotatably mounted in an overhanging plate 45 so that the semiconductor elements are below the surface of the plate and are located above the array of mounting headers. The plate 45 is mounted on a lateral slider assembly 47 so as to permit limited vertical movement with respect to the assembly and the base member 43. Thus, the array of semiconductor elements may be rotated and moved laterally in any direction to orient the semiconductor elements and register them in a desired position with respect to the base member 43; and, in addition, the array may be moved vertically a limited distance with respect to the base member.

This arrangement permits any one of the semiconductor elements and any one of the mounting headers to be positioned directly beneath a vertically movable tool column 46. After the plate 41 has been rotated to orient the mounting headers properly, movement of the array through increments of a predetermined distance by means of the slider assembly 42 successively places the mounting headers in desired position beneath the tool column 46. Similarly, after the supporting ring 44 has been rotated so as to properly orient the semiconductor elements, movement of the plate 45 through increments of a predetermined distance by means of the slider assembly 47 successively places the semiconductor elements in desired position beneath the tool column 46.

Figure 8:
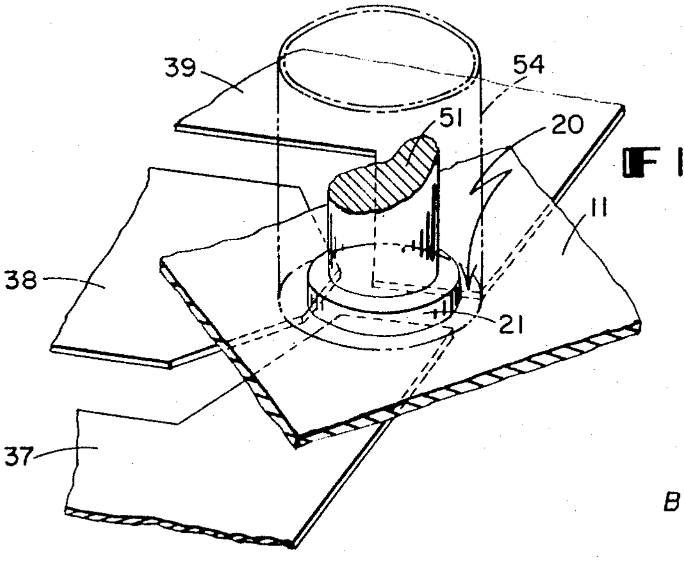
FIG. 8 is a perspective view illustrating a semiconductor element of an array superimposed on a group of conductive regions of a mounting header and being bonded thereto.

FIG. 8 illustrates registration of the array of semiconductor elements with respect to the array of mounting headers with a group of conductive regions 37, 38, and 39 of a mounting header positioned in bonding location beneath the tool column and with a properly oriented semiconductor element 20 superimposed on the mounting header in position to be attached thereto. Each of the mounting pads of the contact members connected to an active zone of the semiconductor element is aligned with a mating portion of a different conductive region of the group of regions.

After the array of headers and the array of semiconductor elements have been moved horizontally to obtain proper alignment, the overhanging plate 45 is lowered to place the semiconductor element 20 in contact with the mounting header at the bonding location. Then the tool column is lowered pressing a bonding tool 51 against the semiconductor die 21 as illustrated in FIG. 8. The bonding tool forces the contact pad portions of the contact members 12, 13, and 14 against the mating portions of the conductive regions 37, 38, and 39, respectively, and bonds the contact pads to the respective regions as by ultrasonic welding.

After the bonds have been made, the bonding tool 51 is retracted, and a tool 54, shown in phantom, is lowered to break the sheet of silicon oxide, thus severing the bonded semiconductor element from the array. The silicon oxide is a readily breakable material, and a blow by the tool is sufficient to fracture the sheet of oxide along the edge of the tool. If the oxide supporting the element in the array consists of one or more bars of silicon oxide, for example as illustrated in FIGS. 5 and 5A, rather than a continuous sheet of oxide, the breaking tool may be modified so as to encompass only the width of the segments holding the die in the array.

After the bonding operation and breaking of the supporting oxide, the overhanging plate 45 is raised slightly. The array of semiconductor elements and the array of mounting headers are each moved a predetermined distance by indexing the slider assemblies 47 and 42 to position a group of conductive regions at the bonding location and to superimpose a semiconductor element over the conductive regions at the bonding location. The process of bonding the semiconductor element to the mounting header, breaking the oxide to separate the element from the array and moving the arrays is repeated.

Figure 9:
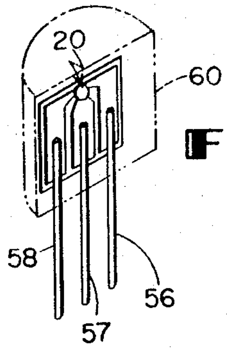
FIG. 9 is a perspective view of a completed semiconductor device showing a semiconductor element mounted on a header with the outline of the solid encapsulating material of the device enclosure indicated in phantom.

The foregoing procedure is repeated continually to produce an array of header mounted semiconductor elements. The insulating board 36 is then cut into individual headers and lead wires 56, 57, and 58 are attached to the conductive regions as by welding. Each of the headers and its mounted semiconductor element 20 is then encapsulated in a suitable plastic material. FIG. 9 illustrates a semiconductor element, individual header, and lead wires as embedded in a solid plastic enclosure 60, indicated in phantom, to provide a completed device.

Figure 10:
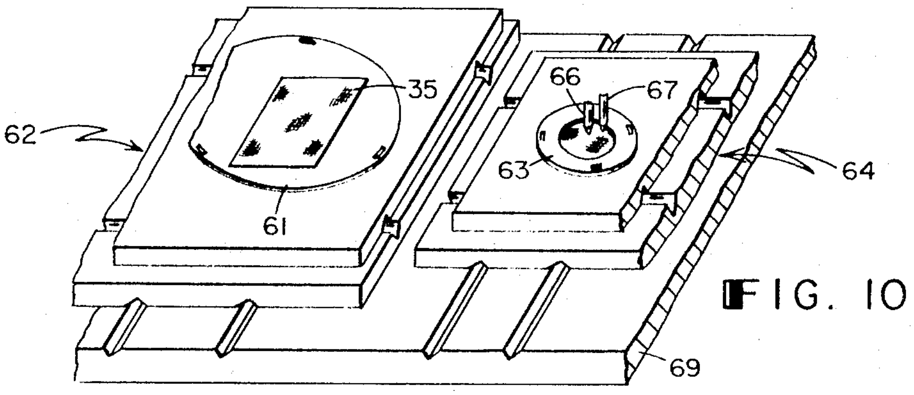
FIG. 10 is a representation in perspective of movable supports and tool supporting structures for use in transferring semiconductor elements from an array of elements and bonding them to the mounting headers of the array of headers in accordance with a different procedure.
Figure 11:
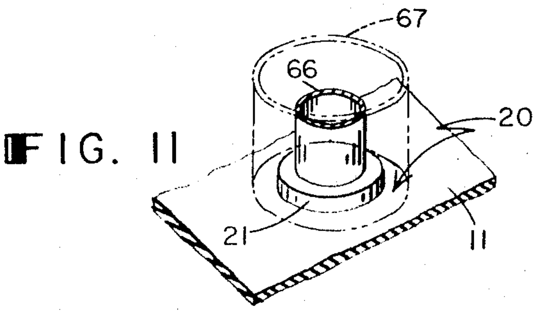
FIG. 11 is a perspective view illustrating the removal of a semiconductor element from an array of semiconductor elements.
Figure 12:
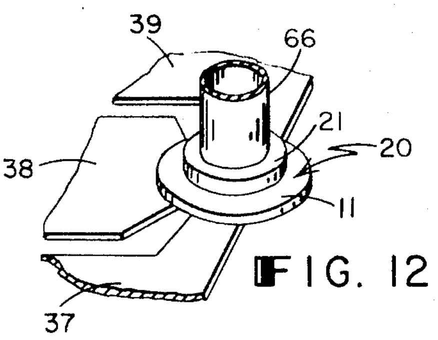
FIG. 12 is a perspective view illustrating the semiconductor element transferred from the array of elements and being bonded to a mounting header of the array of headers.

Another method of bonding semiconductor elements of an array to mounting headers of an array is illustrated by FIGS. 10, 11, and 12. The array of mounting headers 35 is mounted on a plate 61 which is rotatably mounted on a lateral slider assembly 62. The array of semiconductor elements is similarly mounted on a plate 63 which is rotatably mounted on a lateral slider assembly 64. The array of semiconductor elements may be held on the plate 63 as by bonding at an outer edge of the array.

After the array of headers has been properly positioned and oriented, the slider assembly 62 may be indexed continually through increments of a predetermined distance to place each mounting header in succession in a predetermined bonding location with respect to the base member 69. Similarly, after the array of semiconductor elements has been properly positioned and oriented, the slider assembly 64 may be indexed continually to place each semiconductor element in succession at a transfer location beneath a vacuum pick-up and bonding tool 66 and a breaking tool 67.

When a semiconductor element 20 has been placed in the transfer location, the breaking tool 67 (shown in phantom in FIG. 11) is lowered to fracture the silicon oxide supporting the semiconductor die in the array along the edge of the tool, thereby severing the semiconductor element from the array. The breaking tool 67 may be appropriately modified if one or more bars of oxide are employed to hold the die in the array, for example as illustrated in the modification of FIGS. 5 and 5A. The pick-up and bonding tool 66 is lowered into contact with the semiconductor die 21 of the element as illustrated in FIG. 11. The tool grips the semiconductor die, and then the tool is moved to carry the severed semiconductor element 20 from the transfer location to the bonding location.

The tool 66 places the semiconductor element 20 at the bonding location with the contact pads of the contact members 12, 13, 14 in contact with the conductive regions 37, 38, and 39, respectively, of the mounting header at the bonding location as illustrated in FIG. 12. The tool 66 holds the semiconductor element in proper position, and bonds the contact pads to the conductive regions of the header as by ultrasonic welding.

The procedure of moving the arrays predetermined distances, transferring the semiconductor element of the array from the transfer location to the mounting header at the bonding location, and bonding the semiconductor element to the header is repeated continually to produce an array of mounted semiconductor elements. The headers and bonded elements may then be further processed in the manner described previously to produce discrete semiconductor devices as illustrated in FIG. 9.

Another method of bonding semiconductor elements of an array to mounting headers of an array may also be illustrated by FIGS. 10, 11, and 12. The array of mounting headers and the array of semiconductor elements are mounted on plates 61 and 63, respectively, and appropriately positioned and oriented with respect to the base member 69. As illustrated in FIG. 11 the vacuum pick-up and bonding tool 66 is lowered into contact with a semiconductor element after the breaking tool 67 has been lowered to fracture the oxide holding the die in the array. The semiconductor element is then transferred from the array of semiconductor elements to a header of the array, and is bonded to the conductive regions of the header by the pick-up and bonding tool 66 as illustrated in FIG. 12.

This procedure is repeated by appropriately indexing the breaking tool 67 and the pick-up and bonding tool 66 while holding the arrays fixed with respect to the base member 69. Thus, each semiconductor element in succession is severed from its fixed position, transferred to a header, and bonded to the header to produce an array of mounted semiconductor elements. The method may also be varied by breaking all the silicon dice out of the silicon oxide holding them in the array before transferring any of the semiconductor elements from the array of semiconductor elements to the array of headers. This technique requires that shifting of the semiconductor elements with respect to each other be prevented until the elements are transferred from the array.

While there has been shown and described what are considered preferred embodiments of the present invention, it will be obvious to those skilled in the art that various changes and modifications may be made therein without departing from the invention as defined in the appended claims.

What is claimed is:

1. The method of producing semiconductor devices including the steps of:

providing a wafer of semiconductor material having a plurality of regions, each region having the electrically active zones of a semiconductor element fabricated therein, and said water having one major surface coated with an adherent layer of a non-conductive material;

removing portions of the layer of non-conductive material to expose surface areas of each region of the wafer at which contact is to be made;

forming a conductive member making electrical connection to each of said areas at which contact is to be made;

covering the surface areas of said regions in the opposite major surface of the wafer with a protective coating; and removing the semiconductor material of the wafer except the semiconductor material of the regions covered by the protective coating whereby discrete dice of semiconductor material are formed, each die including the electrically active zones of a semiconductor element and having conductive members making electrical connection to said areas, and each die being supported in fixed relationship to every other die by said layer of non-conductive material, thereby providing an array of semiconductor elements.

2. The method of producing semiconductor devices in accordance with claim 1 wherein:

the semiconductor material of the wafer is silicon, and the non-conductive material of the layer is silicon oxide.

3. The method of producing semiconductor devices in accordance with claim 1 and further including the steps of:

providing a mounting header comprising a member of non-conductive material having a group of conductive regions thereon;

breaking the non-conductive material supporting one of the semiconductor elements in fixed relationship to every other semiconductor element thereby serving the one semiconductor element from the array of semiconductor elements;

transferring the one semiconductor element to the mounting header; and electrically connecting the conductive members of the one semiconductor element to respective conductive regions of the group.

4. The method of producing semiconductor devices including the steps of:

providing a body of semiconductor material having a plurality of regions, each region having the electrically active zones of a semiconductor element fabricated therein, and said body having a surface coated with an adherent layer of a non-conductive material;

removing portions of the layer of non-conductive material to expose the surface of portions of the body of semiconductor material, to leave non-conductive material overlying portions of the surface of each of the regions, to leave a segment of non-conductive material projecting from the non-conductive material overlying the surface of each of the regions, and to leave a supporting network of non-conductive material adherent to each of said segments of non-conductive material at a point spaced from its associated region; and removing semiconductor material of the body to leave discrete dice of semiconductor material, each die including the electrically active zones of a semiconductor element and being supported in said network of non-conductive material by the segment of non-conductive material projecting from the non-conductive material overlying the surface of the associated region, thereby providing an array of semiconductor elements.

5. The method of producing semiconductor devices including the steps of:

providing a body of semiconductor material having plurality of regions, each region having the electrically active zones of a semiconductor element fabricated therein, and said body having a surface coated with an adherent layer of a non-conductive material;

removing portions of the layer of non-conductive material to expose the surface of portions of the body of semiconductor material including areas of each region of the body at which electrical contact is to be made, to leave non-conductive material overlying portions of the surface of each of the regions, to leave a segment of non-conductive material projecting from the non-conductive material overlying the surface of each of the regions, and to leave a supporting network of non-conductive material adherent to each of said segments of non-conductive material ta a point spaced from its associated region;

forming a conductive member making electrical connection to each of said areas at which contact is to be made; and removing semiconductor material of the body to leave discrete dice of semiconductor material, each die including the electrically active zones of a semiconductor element and being supported in said network of non-conductive material by the segment of non-conductive material projecting from the non-conductive material overlying the surface of the associated region, thereby providing an array of semiconductor elements.

6. The method of producing semiconductor devices in accordance with claim 5 wherein:

the semiconductor material of the body is silicon, and the non-conductive material of the layer is silicon oxide.

7. The method of producing semiconductor devices in accordance with claim 5 and further including the steps of:

providing a mounting header comprising a member of non-conductive material having a group of conductive regions thereon;

breaking the non-conductive material supporting one of the semiconductor elements in fixed relationship to every other semiconductor element thereby severing the one semiconductor element from the array of semiconductor elements;

transferring the one semiconductor element to the mounting header; and electrically connecting the conductive members of the one semiconductor element to respective conductive regions of the group.

8. The method of producing semiconductor devices in accordance with claim 5 and further including the steps of:

providing a mounting header comprising a member of nonconductive material having a group of conductive regions thereon, the group of regions being arranged to receive the conductive members of a semiconductor element;

positioning the mounting header at a bonding location with the conductive regions of the group oriented in a predetermined manner;

moving the array of semiconductor elements to position one of the semiconductor elements adjacent the group of conductive regions with portions of conductive members of the semiconductor element in registration with respective portions of conductive regions of the group;

moving the one semiconductor element toward the one group of conductive regions to place portions of conductive members of the one semiconductor element in contact with respective portions of conductive regions of the group;

bonding portions of the conductive members of the semiconductor element to contacted portions of the conductive regions of the group; and breaking the non-conductive material supporting the one semiconductor element in fixed relationship to every other semiconductor element thereby severing the one semiconductor element from the array of semiconductor elements.

References Cited

UNITED STATES PATENTS

| | | | |
|---|---|---|---|
| 2,865,082 | 12/1958 | Gates | 29—583 |
| 3,158,788 | 11/1964 | Last | 317—101 |
| 3,235,428 | 2/1966 | Naymik | 29—577 X |
| 3,307,239 | 3/1967 | Lepselter et al. | 29—577 |

OTHER REFERENCES

Western Electric Tech. Dig., No. 4, October 1966, pp. 15–16.

JOHN F. CAMPBELL, Primary Examiner

W. I. BROOKS, Assistant Examiner

U.S. Cl. X.R.

29—578, 583, 591; 148—1.5

PO-1050
(5/69)

UNITED STATES PATENT OFFICE
CERTIFICATE OF CORRECTION

Patent No. 3,456,334 Dated July 22, 1969

Inventor(s) Allen G. Baker and Brian Dale

It is certified that error appears in the above-identified patent and that said Letters Patent are hereby corrected as shown below:

Column 7, line 69, "water" should be--wafer--

Column 8, line 29, "serving" should be--severing--; line 66, at the end of the line after "having" there should be the word --a--

Column 9, line 8, "ta" should be--at--

SIGNED AND
SEALED
JUL 14 1970

(SEAL)
Attest:

Edward M. Fletcher, Jr.
Attesting Officer

WILLIAM E. SCHUYLER, JR.
Commissioner of Patents